Patented May 30, 1933

1,911,689

UNITED STATES PATENT OFFICE

WINFRID HENTRICH AND MAX HARDTMANN, OF WIESDORF-ON-THE-RHINE, GERMANY, ASSIGNORS TO GENERAL ANILINE WORKS, INC., OF NEW YORK, N. Y., A CORPORATION OF DELAWARE

TRIAZINE DERIVATIVES AND THE PROCESS OF MAKING THEM

No Drawing. Application filed October 31, 1928, Serial No. 316,349, and in Germany November 12, 1927.

The present invention relates to new 2-alkyl- or aralkyl - 4.6 - dihalogen - 1.3.5-triazines and to a process of preparing same.

We have found, that 2-alkyl- or aralkyl- 4.6-dihalogen-1.3.5-triazines of the probable formula:

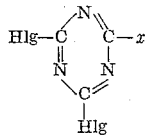

wherein $x$ stands for an alkyl, cyclohexyl or phenylalkyl group, are obtainable by reacting upon a 2.4.6-trihalogen-1.3.5-triazine according to the process known as Grignard's reaction with an alkyl-, cyclohexyl or phenylalkyl magnesiumhalide, such as methylmagnesiumbromide, ethylmagnesiumiodide, cyclohexylmagnesiumbromide, benzylmagnesiumchloride, homobenzylmagnesiumchloride et alia. The "Grignard solutions", prepared in the usual manner, are suitably applied in the theoretical amount, more or less, and are caused to run into a solution of the triazine derivatives in an organic solvent indifferent to Grignard solutions, such as benzene, toluene, amylether et alia, while cooling, the reaction being finished by gentle heating, for instance to about 60–90° C. Obviously the reaction may also be performed by causing the triazine solutions to run into the Grignard solutions.

The products thus obtainable form colorless crystals possessing a very unpleasant odour resembling that of excrements of mice and being generally more irritant than that of cyanuricchloride. The halogen-atoms of our new products are very reactive.

The following example illustrates our invention without limiting it thereto:

*Example.* — A methylmagnesiumbromide solution is prepared from 24 parts by weight of magnesium and 100 parts by weight of methylbromide in 200 parts by volume of ethyl ether, and this solution is caused to drop in a benzene solution of 175 parts by weight of cyanuricchloride while cooling in such a manner, that the temperature does not exceed 10–15° C. Now the reaction mixture is heated to about 60–80° C., whereby magnesium-bromide-chloride separates, the solution is filtered from the latter and concentrated. The 2-methyl-4.6-dichloro-1.3.5-triazine separates in crystals being weakly yellow colored by small amounts of an oily impurity. A further quantity of the same dichloride can be isolated from the filtered off magnesiumbromide-chloride. In this manner a yield of 60% of the dichloride is obtainable. It forms after sublimation in vacuo colorless crystals, melting at 97–98° C. and probably corresponds to the formula:

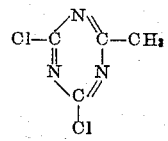

It is easily soluble in benzene, chloroform, acetone e.a., difficultly soluble in benzine and is rather volatile, the vapor possessing a very unpleasant odour resembling that of excrements of mice and being more irritant than that of cyanuricchloride. The chloroatoms of the product are very reactive, f.i. when treating it with an aqueous solution of caustic soda, the chloroatoms are replaced by hydroxygroups and when acidifying the alkaline solution thus obtainable with hydrochloric acid, the 2-methyl-4.6-dihydroxy-1.3.5-triazine is obtainable, which probably corresponds to the formula:

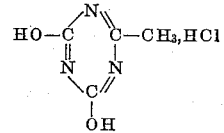

and which product is identical to that described by Andreasch (Monatshefte der Chemie, volume 48, page 151).

We claim:

1. The new products of the probable formula:

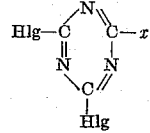

wherein $x$ stands for an alkyl, cyclohexyl or phenylalkyl residue, said products forming colorless crystals of very unpleasant odour.

2. The product of the probable formula:

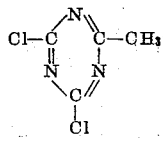

said product forming crystals of the melting point 97 to 98° C.

3. Process which comprises causing about molecular quantities of a 2.4.6-trihalogen-1.3.5-triazine and a compound of the group consisting of alkyl, cyclohexyl and phenylalkyl magnesiumhalide to react upon each other in an inert organic solvent.

4. Process which comprises causing about molecular quantities of a compound of the group consisting of cyanurcchloride and cyanurbromide and a methylmagnesiumhalide to react upon each other in benzene at temperatures up to 90° C.

In testimony whereof we have hereunto set our hands.

WINFRID HENTRICH.
MAX HARDTMANN.